US012013004B2

(12) United States Patent
Gee

(10) Patent No.: US 12,013,004 B2
(45) Date of Patent: Jun. 18, 2024

(54) BRAKE WARNING SYSTEM

(71) Applicant: Geville Gee, Fort Worth, TX (US)

(72) Inventor: Geville Gee, Fort Worth, TX (US)

(*) Notice: Subject to any disclaimer, the term of this patent is extended or adjusted under 35 U.S.C. 154(b) by 70 days.

(21) Appl. No.: 17/873,558

(22) Filed: Jul. 26, 2022

(65) Prior Publication Data
US 2023/0383805 A1 Nov. 30, 2023

Related U.S. Application Data

(60) Provisional application No. 63/230,167, filed on Aug. 6, 2021.

(51) Int. Cl.
F16D 66/02 (2006.01)

(52) U.S. Cl.
CPC ......... F16D 66/024 (2013.01); F16D 66/027 (2013.01)

(58) Field of Classification Search
CPC .............................. F16D 66/024; F16D 66/027
USPC ........................................................ 340/454
See application file for complete search history.

(56) References Cited

U.S. PATENT DOCUMENTS

| 3,805,228 | A | 4/1974 | Peeples |
| 4,004,269 | A | 1/1977 | Arai et al. |
| 4,298,857 | A | 11/1981 | Robins et al. |
| 4,855,712 | A | 8/1989 | Wiley, Jr. et al. |
| 5,433,296 | A | 7/1995 | Webberley |
| 5,967,266 | A | 10/1999 | Carnegie |
| 6,072,389 | A | 6/2000 | Strasburger |
| 6,384,721 | B1 | 5/2002 | Palelli |
| 7,877,216 | B2 * | 1/2011 | Wright .................... F16D 66/02 |
| | | | 701/33.9 |
| 11,084,479 | B2 * | 8/2021 | Kikkawa ............... F16D 66/021 |
| 11,174,910 | B2 | 11/2021 | Kane et al. |
| 2005/0212357 | A1 | 9/2005 | Adams |
| 2005/0252727 | A1 | 11/2005 | England et al. |
| 2009/0084638 | A1 | 4/2009 | Masterson |
| 2012/0285775 | A1 | 11/2012 | Mcgee |
| 2015/0152931 | A1 | 6/2015 | Moore et al. |
| 2016/0146279 | A1 | 5/2016 | Philpott |
| 2020/0180587 | A1 * | 6/2020 | Lin ........................ F16D 66/023 |
| 2020/0232531 | A1 * | 7/2020 | Robere ................... F16D 66/00 |
| 2020/0284311 | A1 * | 9/2020 | Henning ............... F16D 66/023 |

(Continued)

FOREIGN PATENT DOCUMENTS

CN 103818374 A * 5/2014
CN 103818374 A 5/2014

(Continued)

OTHER PUBLICATIONS https://www.autoblog.com/2021/05/06/brembo-g-sessanta-led-lights-brake-caliper/; May 6, 2021.
https://www.youtube.com/watch?v=GW3yxCYdHH8

Primary Examiner — Kerri L McNally
(74) Attorney, Agent, or Firm — John Rizvi; John Rizvi, P.A.—The Patent Professor®

(57) ABSTRACT

A brake warning system has a processing apparatus, a sensing apparatus, a light emitting apparatus, a signal transmitting apparatus, a signal receiving apparatus, a power source apparatus, and a mounting housing. The brake warning system provides a color indicator to indicate the condition of the brake pad whether in "good" condition or "poor" condition and generates a warning message for a user in the event of detecting conditions needing attention and maintenance.

18 Claims, 10 Drawing Sheets

(56) References Cited

U.S. PATENT DOCUMENTS

2020/0309217 A1* 10/2020 Ruiz .................. F16D 55/2255
2021/0394669 A1* 12/2021 Pribula .................... B60Q 1/34

FOREIGN PATENT DOCUMENTS

| CN | 106989775 B | 12/2019 |
|----|-------------|---------|
| EP | 1270983 A1 | 2/2003 |
| KR | 200141795 | 7/1997 |
| KR | 101483722 B1 | 1/2015 |

* cited by examiner

BRAKE WARNING SYSTEM

CROSS REFERENCE TO RELATED APPLICATION

This application claims the benefit of U.S. Provisional Patent Application 63/230,167, filed Aug. 6, 2021, which is hereby incorporated by reference herein in its entirety.

FIELD OF THE INVENTION

The present invention relates generally to a brake warning system, and more particularly, to a brake warning system which is capable of indicating the condition of a brake pad or providing a warning that the brake pad may need replacing.

BACKGROUND OF THE INVENTION

There are a lot of vehicle owners out there who do not consider brake maintenance a priority until something goes wrong. In order for the brake maintenance system to keep functioning properly, certain pieces must be replaced at regular intervals. Among those components, the ones that probably needs to be switched out the most often the brake pads.

Auto manufacturers install two types of brakes on passenger vehicles: disc brakes and drum brakes. Both use friction to slow the vehicle, but there are differences. Disc brakes use "pads" which is made of specially engineered pieces of friction material such as organic, metallic or ceramic substances pressed against a rotor or "disc" when the driver steps on the brakes; the resulting friction slows the vehicle. Drum brakes also use friction material, much like disc brake pads, but it is affixed to half-moon shaped "shoes" pressed against the inside of a drum when the driver steps step on the brakes; their friction against the drum slows the vehicle.

Every time the driver engages the vehicle's brakes, a small amount of friction material is worn off the brake pads. Over time, the friction material will become thinner. If the brake pads are not replaced, the friction material will be worn off entirely, exposing the steel pieces that held the material. When these steel pieces come into contact with the discs or drums, excessively long braking distances and damage to the discs and drums will result.

There are signs to know when to replace brake pads, for instance, squealing or screeching noises, less than a quarter inch of brake pad, deep metallic grinding and growling, and brake fade.

The squealing, screeching or whining noise is caused by a small metal attachment on the brake pad backing plate for just this purpose; when such sound is heard regularly while braking, it is time to bring the vehicle in to a brake specialist for an inspection and for replacement.

On disc brakes, the brake pads can also be visually inspected to know if it is time to replacement. However, it may require removing the wheels to do the inspection. If the friction material on the brake pad is less than a quarter inch thick (about seven millimeters), it is time to bring the vehicle in to a brake specialist for an inspection and for replacement.

If deep, low noise that sounds like metal grinding or a rumbling growl is heard, that can be a sign that not only are the brake pads worn away, but also the brake pads are making contact with the discs; since this metal on metal contact can very quickly cause even further damage in the braking system, it's time to bring the vehicle in to a brake specialist for an inspection and for replacement.

Brake fade is the direct result of intentionally applying the brakes over a vast distance without bringing the vehicle to a full stop. By forcing the brake pads to make contact with the rotors for a long, uninterrupted period, both components will heat up. In the process, the ability to generate needed friction against each other is reduced over time. As a result, the driver will find that the vehicle will not come to a complete stop.

There are other signs to know when to replace brake pads. For example, the vehicle's brake pads will not always wear out at the exact same rate. Sometimes, those on one side will get thinner faster than their counterparts on the other side. Should this occur, the vehicle may pull slightly to the left or right once the driver hits the brakes.

However, none of the above methods and signs can provide a color indicator to indicate the condition of the brake pad whether in "good" condition or "poor" condition. Further, none of the above methods and signs can directly generate a warning message for a user to see on a user device.

Accordingly, there is need for a solution to at least one of the aforementioned problems.

SUMMARY OF THE INVENTION

The present invention is directed to a brake warning system.

In a first implementation of the invention, there is a brake warning system comprising: a controller apparatus; a mounting housing; a sensing apparatus coupled with the mounting housing, wherein the sensing apparatus is configured for monitoring a wear condition of a brake pad of a brake assembly; a light emitting apparatus, wherein the light emitting apparatus and the sensing apparatus are electrically coupled with the controller apparatus; and wherein the mounting housing is configured to mount to the brake pad of the brake assembly for producing a status indication as a function of the wear condition monitored that is transmitted by the light emitting apparatus In another aspect, the brake warning system comprises a processing apparatus, a sensing apparatus, a light emitting apparatus, a signal transmitting apparatus, a signal receiving apparatus, a power source apparatus, and a mounting housing.

In another aspect, the processing apparatus, the sensing apparatus, the light emitting apparatus, the signal transmitting apparatus, the signal receiving apparatus and the power source apparatus are electrically coupled with each other.

In another aspect, the sensing apparatus is electrically coupled with the processing apparatus.

In another aspect, the light emitting apparatus is electrically coupled with the processing apparatus.

In another aspect, the signal transmitting apparatus is electrically coupled with the processing apparatus.

In another aspect, the signal receiving apparatus is electrically coupled with the processing apparatus.

In another aspect, the power source apparatus is electrically coupled with the processing apparatus.

In another aspect, the power source apparatus provides power energy to the processing apparatus.

In another aspect, the power source apparatus provides power energy to the sensing apparatus.

In another aspect, the power source apparatus provides power energy to the light emitting apparatus.

In another aspect, the power source apparatus provides power energy to the signal transmitting apparatus.

In another aspect, the power source apparatus provides power energy to the signal receiving apparatus.

In another aspect, the processing apparatus is a central processing unit (CPU).

In another aspect, the sensing apparatus is one of a current sensor, a thermal sensor, a magnetic sensor and a distance sensor.

In another aspect, the light emitting apparatus is a light emitting diode (LED) which is capable of emitting green light, yellow light and red light.

In another aspect, the signal transmitting apparatus is a wireless transmitter.

In another aspect, the signal receiving apparatus is a wireless receiver.

In another aspect, the power source apparatus is a vehicle battery.

In another aspect, the mounting housing is configured to be mounted onto a brake pad of a vehicle, and the light emitting apparatus is mounted onto the mounting housing.

In another aspect, the mounting housing comprises an arc-shaped plate and a slot.

In another aspect, the slot traverses into the arc-shaped plate.

In another aspect, the arc-shaped plate comprises a first flat surface, a second flat surface and a lateral curved convex surface.

In another aspect, the first flat surface and the second flat surface are oppositely, located to each other; the lateral curved convex surface is formed in between the first flat surface and the second flat surface; the lateral curved convex surface is perimetrically connected with the first flat surface; the lateral curved convex surface is perimetrically connected with the second flat surface.

In another aspect, the slot traverses into the first flat surface.

In another aspect, the light emitting apparatus comprises a first light emitting diode and a second light emitting diode.

In another aspect, the first light emitting diode is attached to the lateral curved convex surface; the first light emitting diode is inserted into the lateral curved convex surface; the first it emitting diode is visually exposed on the lateral curved convex surface; the second light emitting diode is attached to the lateral curved convex surface; the second light emitting diode is inserted into the lateral curved convex surface; the second light emitting diode is visually, exposed on the lateral curved convex surface.

In another aspect, the first light emitting diode and the second light emitting diode are separate from each other via the slot.

In another aspect, the sensing apparatus detects an electrical current level passing through the brake pad for the monitoring of the wear condition.

In another aspect, the controller apparatus receives the electrical current level detected by the sensing apparatus and determines an amount of the electrical current.

In another aspect, the controller apparatus activates the light emitting apparatus as a function of the amount of the electrical current determined.

In another aspect, the light emitting apparatus produces a plurality of color codes for the status indication, wherein each respective color code of the plurality of color codes represents a respective wear condition of the brake pad.

In another aspect, the light emitting apparatus comprises a plurality of light emitting diodes (LEDs), wherein each respective LED of the plurality of LEDs is capable of producing each respective color code of the plurality of color codes.

In another aspect, the light emitting apparatus is attached to either the lateral curved convex surface of the arc-shaped plate of the mounting assembly or a brake caliper of the brake assembly.

In another aspect, the braking warning system communicates with an external user device via the signal transmitting apparatus and the signal receiving apparatus.

In another aspect, the plurality of LEDs are visually exposed on the lateral curved convex surface of the arc-shaped plate of the mounting assembly.

In another aspect, the braking warning system generates and transmits, using the signal transmitting device, an alert message to the external device indicating the brake pad needs maintenance attention based on the status indication.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
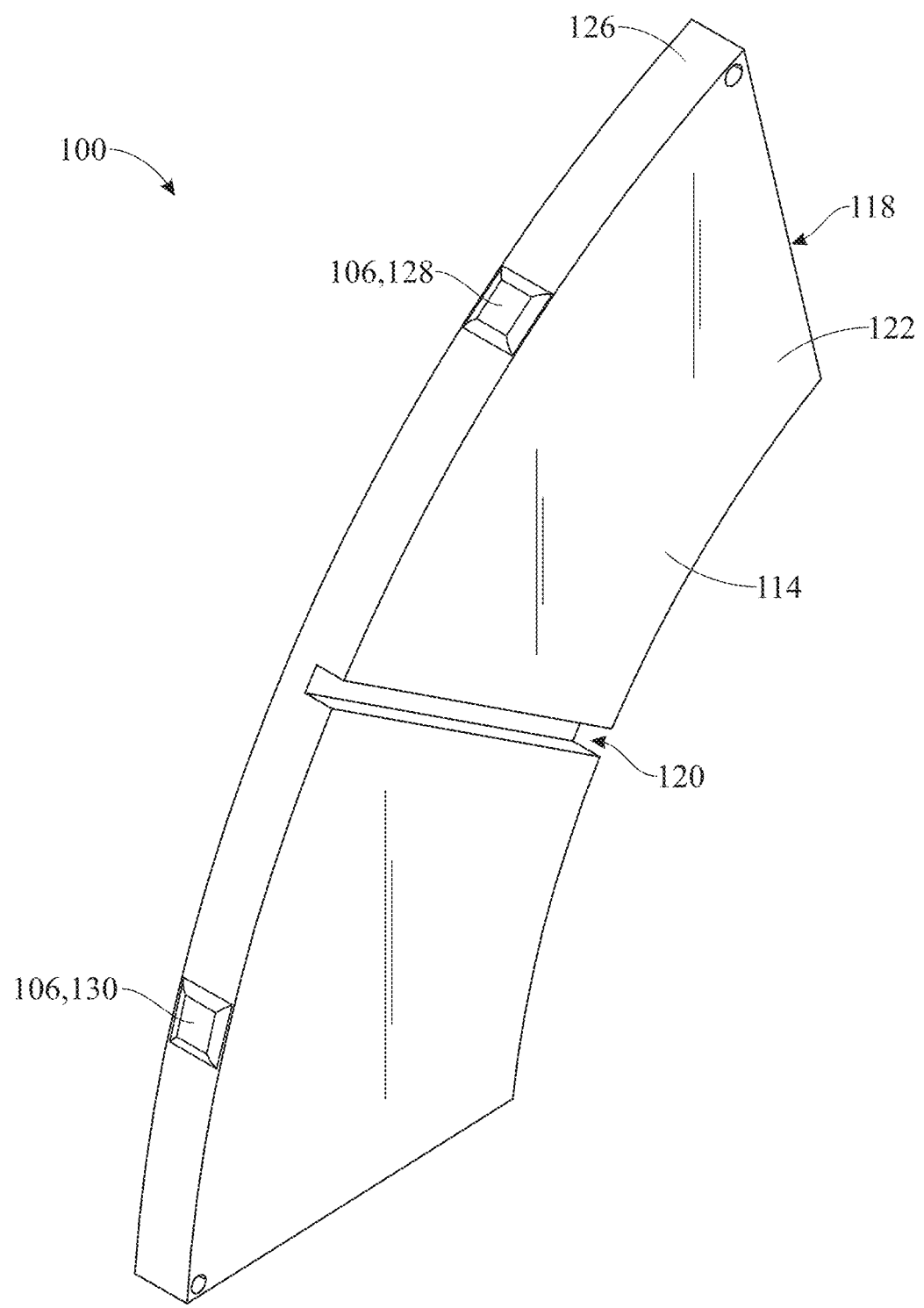
FIG. 1 presents a perspective view of a brake warning system of the present invention showing a mounting housing and a light emitting apparatus mounted onto the mounting housing in accordance with an embodiment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a brake warning system 100. Referring to FIGS. 1-10 in a collective fashion to detail the principles of the disclosed embodiments, the brake warning system 100 comprises a controller apparatus 150, a sensing apparatus 104 (e.g., one or more sensors), a light emitting apparatus 106 (e.g., a light emitting diodes (LED) 128 and 130), a power source apparatus 112 (e.g., a battery) and a mounting housing 114. Illustratively, as shown in FIG. 10, the controller apparatus 150 further comprises a processor 102, a memory 152 and a signal transmitting apparatus 108 and a signal receiving apparatus 110 (which may be a combined transceiver device, for example). As will discussed in greater detail herein below, the mounting housing 114 is coupled with brake pad 116 to deliver the various warnings produced and attributable to the brake warning system 100. As such, the mounting housing 114 is configured to mount to the brake pad 116 of the brake assembly for producing a status indication as a function of the wear condition monitored that is transmitted by the light emitting apparatus 106. In an embodiment, the controller apparatus 150 may be configured using a well-known Arduino microcontroller which is an open-source electronics platform. With the Arduino microcontroller, a user may design and build devices that can interact with their surroundings. In this way, the Arduino boards are basically a tool for controlling electronics and are able to read inputs with an onboard microcontroller (e.g., light on a sensor or an object near a sensor) and turn these inputs into an output (e.g., drive a motor, ring an alarm, turning on an LED, or display information on a display).

In this embodiment of the present invention, the controller apparatus 150, the sensing apparatus 104, the light emitting apparatus 106, the signal transmitting apparatus 108, the signal receiving apparatus 110 and the power source apparatus 112 are electrically coupled with each other. In this embodiment of the present invention, specifically, the sensing apparatus 104 is electrically and communicatively coupled with the processor 102; the light emitting apparatus 106 is electrically and communicatively coupled with the processor 102; the signal transmitting apparatus 108 is electrically and communicatively coupled with the processor 102; the signal receiving apparatus 110 is electrically coupled and communicatively with the processor 102; and the power source apparatus 112 is electrically coupled with the processor 102. These various couplings are facilitated by and through electrical and communications links 158. The communications between the various components of the brake warning system 100 may utilize wired and/or wireless communications links.

In this embodiment of the present invention, the power source apparatus 112 provides power energy to the processor 102; the power source apparatus 112 provides power energy to the sensing apparatus 104; the power source apparatus 112 provides power energy to the light emitting apparatus 106; the power source apparatus 112 provides power energy to the signal transmitting apparatus 108; and the power source apparatus 112 provides power energy to the signal receiving apparatus 110.

In this embodiment of the present invention, the processor 102 is a logic circuitry that responds to and processes basic instructions that drive a computer. A processor is seen as the main and most crucial integrated circuitry (IC) chip in a computer. A processor is responsible for interpreting most computer commands. A processor will perform most basic arithmetic, logic and IO operations, as well as allocate commands for other chips and components running in a computer. In this embodiment of the present invention, specifically, the processor 102 is a central processing unit (CPU). The processor 102, as powered by the power source apparatus 112, may include both general and special purpose microprocessors, and may be the sole processor or one of multiple processors of the device. Further, the processor 102 may comprise one or more central processing units (CPUs) and may include, be supplemented by, or incorporated in, one or more application-specific integrated circuits (ASICs) and/or one or more field programmable gate arrays (FPGAs). The memory 152 may comprise a non-transitory, computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM); electrically erasable programmable read-only memory (EEPROM), compact disc read-only memory (CD-ROM), digital versatile disc read-only memory (DVD-ROM) disks, or other non-volatile solid state storage devices.

In this embodiment of the present invention, the sensing apparatus 104 might be, but not limited to, a sensor. For example, a current sensor is a device that detects electric current in a wire and generates a signal proportional to that current. The generated signal could be analog voltage or current or a digital output. The generated signal can be then used to display the measured current in an ammeter or can be stored for further analysis in a data acquisition system or can be used for the purpose of control. The sensed current and the output signal can be: alternating current input and analog output; alternating current input and bipolar output; alternating current input and unipolar output; direct current input and unipolar output; direct current input and digital output. In this embodiment of the present invention, specifically, the sensing apparatus 104 is a current sensor. In this way, the sensing apparatus detects 104 an electrical current level passing through the brake pad 116 for the monitoring of the wear condition, the controller apparatus 150 receives the electrical current level detected by the sensing apparatus 104 and determines an amount of the electrical current and the controller apparatus activates the light emitting apparatus 104 as a function of the amount of the electrical current determined. Of course, other types of sensors may be utilized, in accordance with the principles of the disclosed embodiments, for monitoring the brake pad 116 including, but not limited to, thermal sensors, magnetic sensors and distance sensors.

In this embodiment of the present invention, the light emitting apparatus 106 might be, but not limited to, a light emitting diode (LED). An LED is a semiconductor light source that emits light when current flows through it. Electrons in the semiconductor recombine with electron holes, releasing energy in the form of photons. The color of the light (corresponding to the energy of the photons) is determined by the energy required for electrons to cross the band gap of the semiconductor. White light is obtained by using multiple semiconductors or a layer of light-emitting phosphor on the semiconductor device. LEDs are usually used in applications as diverse as aviation lighting, fairy lights, automotive headlamps, advertising; general lighting, traffic signals, camera flashes, lighted wallpaper, horticultural grow lights, and medical devices. In this way, LEDs have many advantages over incandescent light sources, including lower power consumption, longer lifetime, improved physical robustness, smaller size, and faster switching. In an embodiment of the present invention, specifically, the light emitting apparatus 106 is an LED which is capable of emitting green light, yellow light and red light. In this embodiment, the light emitting apparatus comprises a plurality of LEDs, wherein each respective LED of the plurality of LEDs is capable of producing each respective color code of a plurality of color codes employed for indicating the status condition of the brake pad 116 as a function of the wear condition monitored.

In this embodiment of the present invention, the signal transmitting apparatus 108 might be, but not limited to, a transmitter. In electronics and telecommunications, a transmitter or radio transmitter is an electronic device which produces radio waves with an antenna. A transmitter itself generates a radio frequency alternating current, which is applied to the antenna. When excited by this alternating current, the antenna radiates radio waves. A transmitter is necessary a component part of an electronic device that communicate by radio, such as radio and television broadcasting stations, cell phones, walkie-talkies, wireless computer networks, Bluetooth enabled devices, garage door openers, two-way radios in aircraft, ships, spacecraft, radar sets and navigational beacons. A transmitter usually generates radio waves for communication purposes; or radiolocation, such as radar and navigational transmitters. In this embodiment of the present invention, specifically, the signal transmitting apparatus 108 is a wireless transmitter.

In this embodiment of the present invention, the signal receiving apparatus 110 might be, but not limited to, a receiver. In radio communications, a radio receiver, also known as a receiver, is an electronic device that receives radio waves and converts the information carried by them to a usable form Radio receivers are essential components of all systems that use radio. The information produced by the receiver may be in the form of sound, moving images (television), or digital data. A radio receiver may be a separate piece of electronic equipment, or an electronic circuit within another device. A radio receiver is very widely used in modern technology, such as in televisions, cell phones, wireless modems and other components of communications, remote control, and wireless networking systems. In this embodiment of the present invention, specifically, the signal receiving apparatus 110 is a wireless receiver.

In this embodiment of the present invention, the power source apparatus 112 might be, but not limited to, a battery. For example, an automotive battery is a rechargeable battery that is used to start a motor vehicle; its main purpose is to provide an electric current to the electric-powered starting motor, which in turn starts the chemically-powered internal combustion engine that actually propels the vehicle; once the engine is running, power for the vehicle's electrical systems is still supplied by the battery, with the alternator charging the battery as demands increase or decrease. Additionally, an electric-vehicle battery is a battery used to power the electric motors of a battery electric vehicle or hybrid electric vehicle; these batteries are usually rechargeable (secondary) batteries and are typically lithium-ion batteries. In this embodiment of the present invention, specifically, the power source apparatus 112 is a vehicle battery.

In an embodiment of the present invention, the mounting housing 114 is configured to be mounted onto a brake pad 116 of a brake assembly a vehicle, and the light emitting apparatus 106 is mounted onto the mounting housing 114 in accordance with an embodiment (as further discussed herein below with reference to FIG. 6). In a further embodiment, the mounting housing 114 is configured to be mounted onto the brake pad 116 of the brake assembly the vehicle and the light emitting apparatus 106 is mounted on a caliper 134 of the brake assembly (as further discussed herein below with reference to FIG. 6). For example, turning our attention to FIG. 5 a perspective view of an outer portion 154 and inner portion 156 of the brake pad 116 is shown. As will be appreciated, brake pads are composed of steel backing plates (e.g., the outer portion 154) with friction material bound to the surface that faces the disc brake rotors and the a typical brake assembly for a standard vehicle has two brake pads per brake assembly for each wheel of the vehicle with one brake pad of the brake assembly nearer the inner portion of the wheel (i.e., the inner portion of the rotor 106) and the second brake pad of the brake assembly nearer the outer portion of the wheel (i.e., the outer portion of the rotor 106). In this way, the mounting housing 114, in accordance with the principles of the disclosed embodiments, may be affixed to outer portion 154 (i.e., the steel backing plate) of a respective brake pad given that the inner portion 156 comprises the friction material that faces the rotor 106 and causing braking of a vehicle when the operator applies the brakes in the normal course of driving. This configuration may be further understood in FIG. 8 (see also, FIG. 4) which presents a front cutaway view of the brake assembly 146 showing the rotor 106, the mounting housing 114 and the sensing apparatus 106 of the brake warning system 100 of the present invention in accordance with the embodiment. Advantageously, the brake warning system 100 in accordance with the principles of the disclosed embodiments may be configured as a kit assembly such that the system may be added to and utilized with any type of brake pad and brake assembly.

In an aspect of this embodiment of the present invention, the mounting housing 114 comprises an arc-shaped plate 118 and a slot 120; the slot 120 traverses into the arc-shaped plate 118; the arc-shaped plate 118 comprises a first flat surface 122, a second flat surface 124 and a lateral curved convex surface 126; the first flat surface 122 and the second flat surface 124 are oppositely located to each other; the lateral curved convex surface 126 is formed in between the first flat surface 122 and the second flat surface 124; the lateral curved convex surface 126 is perimetrically connected with the first flat surface 122; the lateral curved convex surface 126 is perimetrically connected with the second flat surface 124; the slot 120 traverses into the first flat surface 122.

In this aspect of this embodiment of the present invention, the light emitting apparatus 106 comprises a first light emitting diode 128 and a second light emitting diode 130; the first light emitting diode 128 is attached to the lateral curved convex surface 126; the first light emitting diode 128 is inserted into the lateral curved convex surface 126; the first light emitting diode 128 is visually exposed on the lateral curved convex surface 126; the second light emitting diode 130 is attached to the lateral curved convex surface 126; the second light emitting diode 130 is inserted into the lateral curved convex surface 126; the second light emitting diode 130 is visually exposed on the lateral curved convex surface 126; the first light emitting diode 128 and the second light emitting diode 130 are separate from each other via the slot 120.

Figure 2:
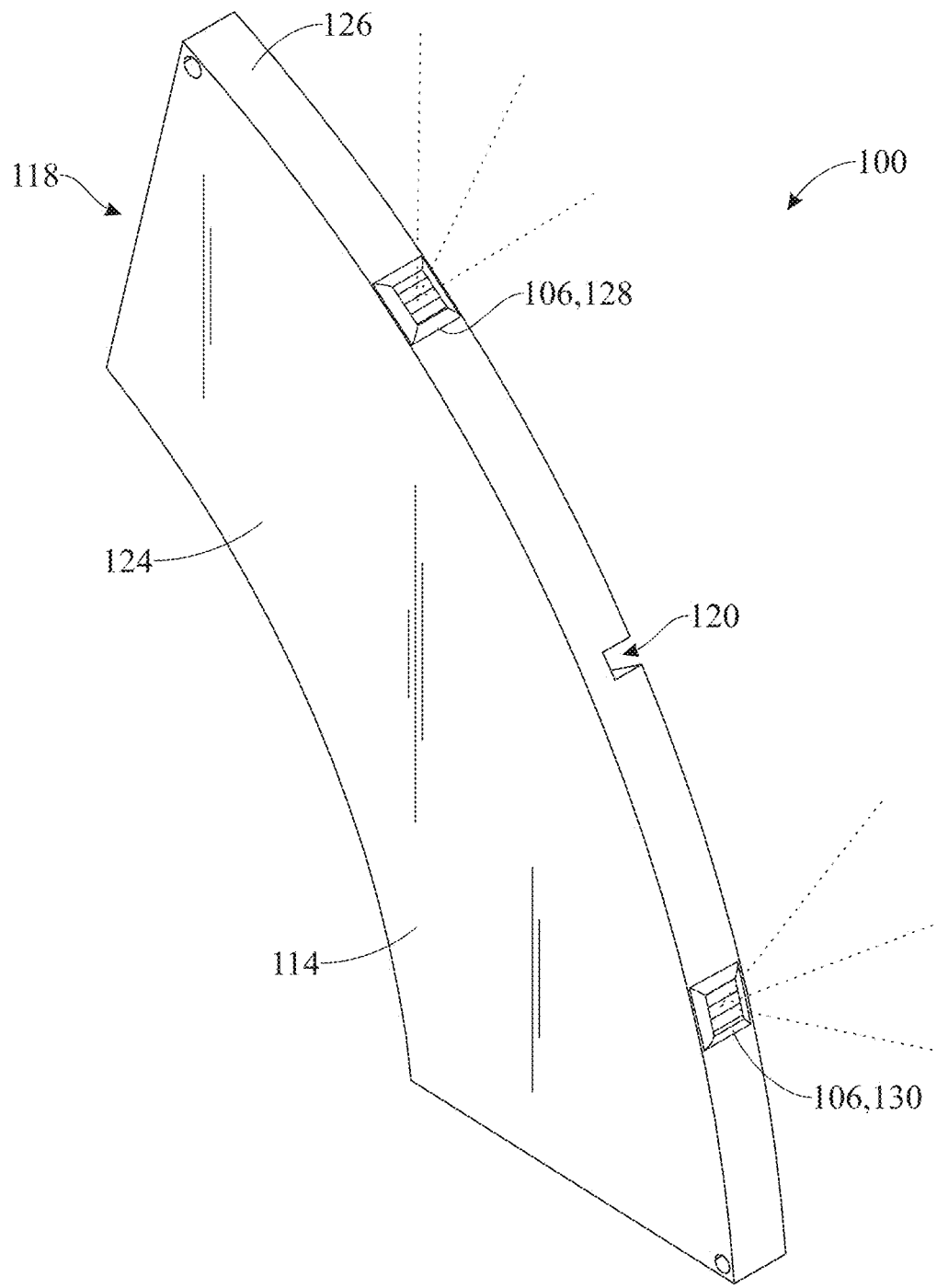
FIG. 2 presents another perspective view of the brake warning system of the present invention showing that the light emitting apparatus emits light in accordance with an embodiment.
Figure 6:
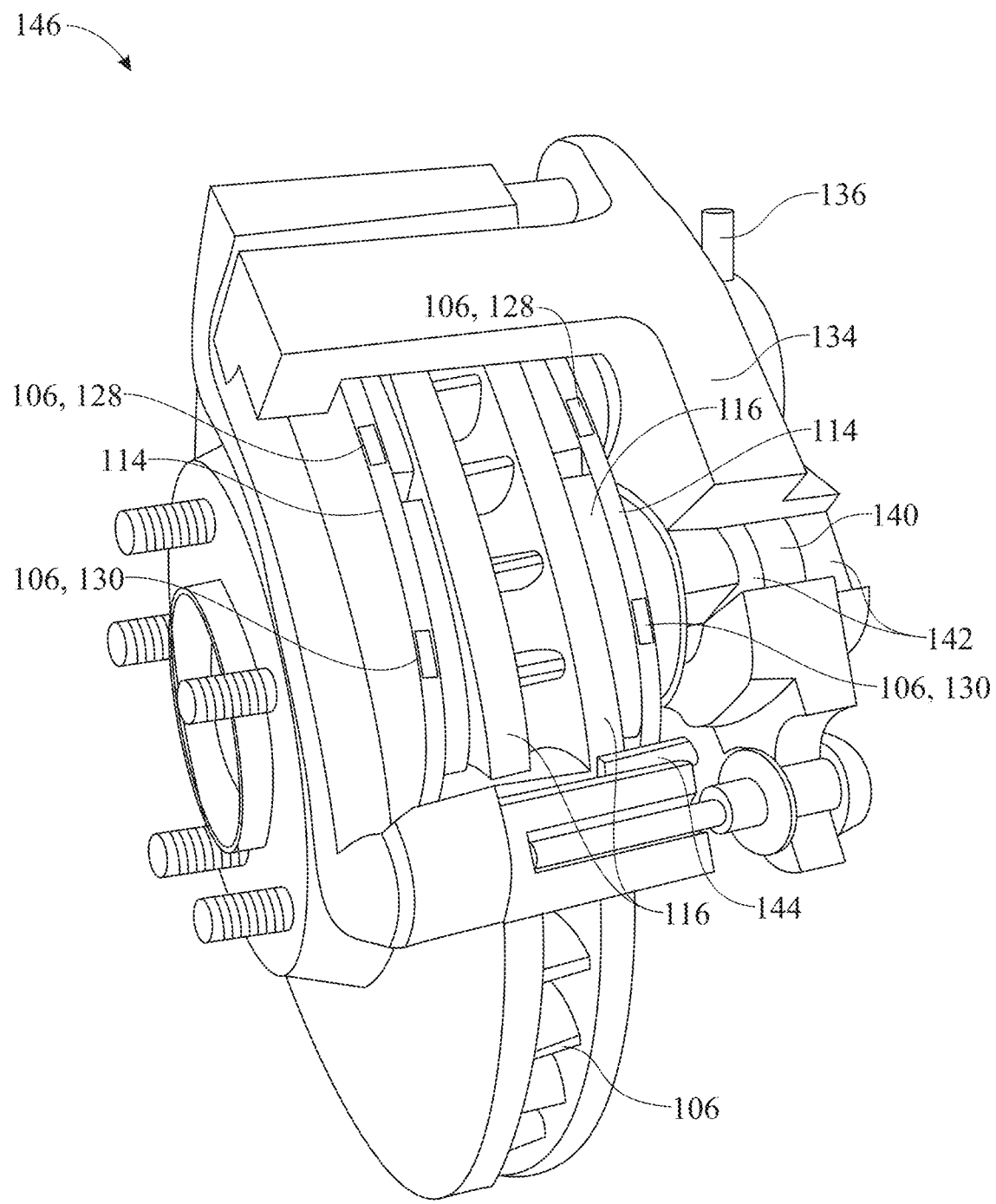
FIG. 6 presents a sectional view of a brake assembly with a brake pad and mounting housing configuration in accordance with FIG. 1 in accordance with an embodiment of the present invention.

Turning our attention to FIG. 6, a sectional view of a brake assembly 146 with the brake pad 116 and the mounting housing 114 configuration as shown in FIGS. 1 and 2 in accordance with an embodiment of the present invention. The brake assembly 146 comprises the rotor 106, brake pads 116, caliper 134, bleeder 136, dust boot 138, piston seal 140, piston 142, and anti-rattle clips 144. As will be appreciated, the brake assembly 146 has the brake pads 116, as separated by the slot 120, proximate to each side of the rotor 106 such that when the individual brake pads 116 are engaged by the operator of a vehicle a force will be applied to the rotor thereby braking the vehicle and slowing the vehicle down. In accordance with this embodiment, each one of the brake pads 116 is configured with a respective mounting housing 114 comprising the first light emitting diode 128 and the second light emitting diode 130, as the case may be. The principles of the disclosed embodiments apply equally to any vehicle using a brake assembly with brake pad s including, but not limited to, cars, trucks, semi-tractor trailers and motorcycles, to name just a few.

In this embodiment of the present invention, the brake warning system 100 is configured to be applied to the brake pad 116, so as to sense and detect the amount of current that passes through the brake pad 116, and to produce color codes (Green/Yellow/Red) which indicates the condition of the brake pad 116 based upon the current, and thus indicates the condition of the brake pad 116 or provides a warning that the brake pad 116 may need replacing according to the color codes.

When the mounting housing 114 is mounted onto the brake pad 116 of the vehicle, the sensing apparatus 104 is able to detect the electrical current that passes through the brake pad 116. Then, the processor 102 determines the amount of current and drives the light emitting apparatus 106 to produce color codes (Green/Yellow/Red), i.e., causes or activates the light emitting apparatus 106 to light up with a corresponding color. Accordingly, the light emitting apparatus 106 works as a color indicator which indicates the condition of the brake pad 116 based upon the current. And people will be able to see these light colors around the brake pad 116 of the vehicle. For example, as shown in FIG. 6, the light emitting apparatus 106 (i.e., the first light emitting diode 128 and the second light emitting diode 130) are visible (e.g., to a mechanic or driver of the vehicle) when viewing the brake assembly 146 through the caliper 134 configuration.

Figure 7:
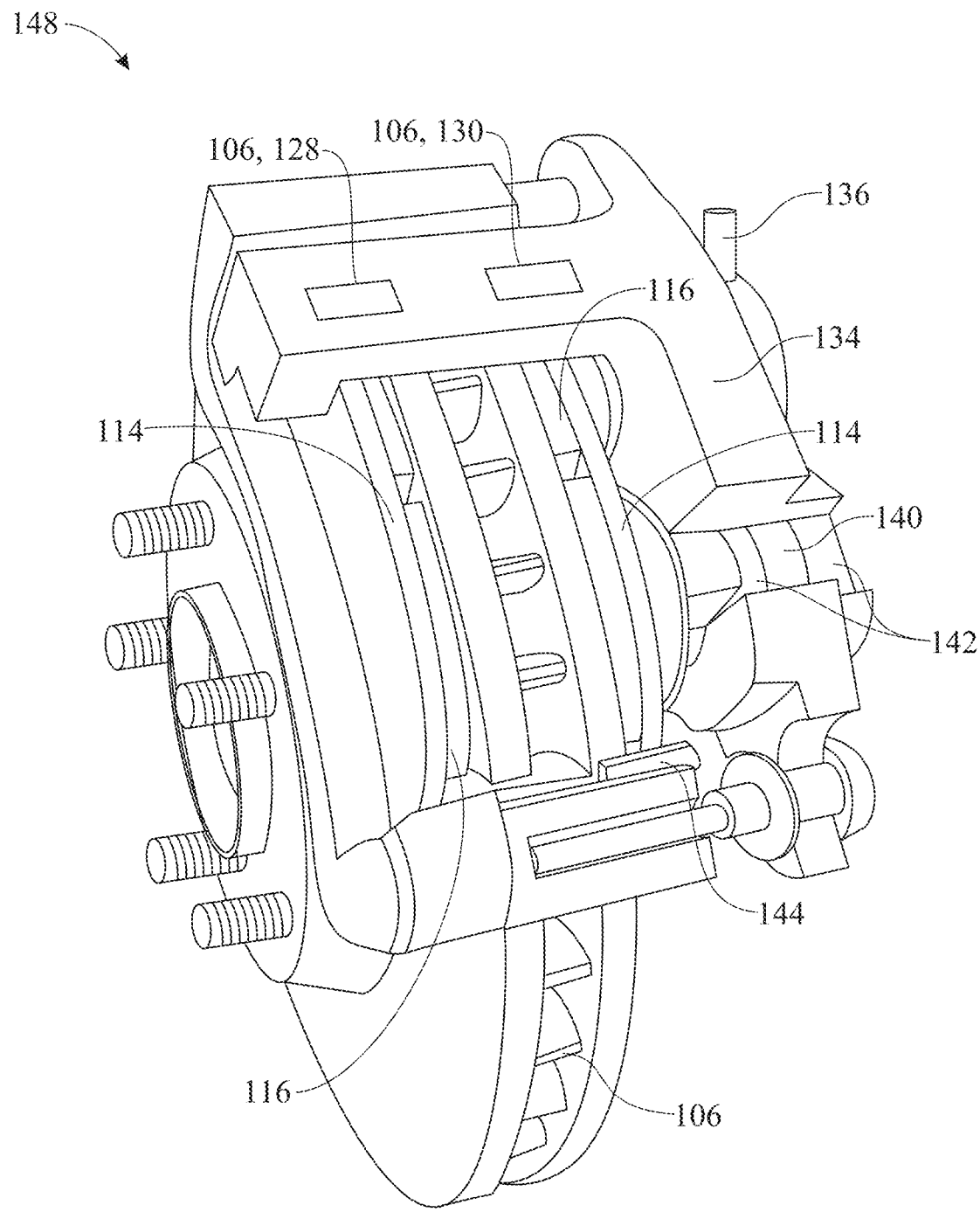
FIG. 7 presents a sectional view of a brake assembly with a brake pad and mounting housing configuration in which the light emitting apparatus is mounted on a caliper of the brake assembly in accordance with an embodiment of the present invention.
Figure 8:
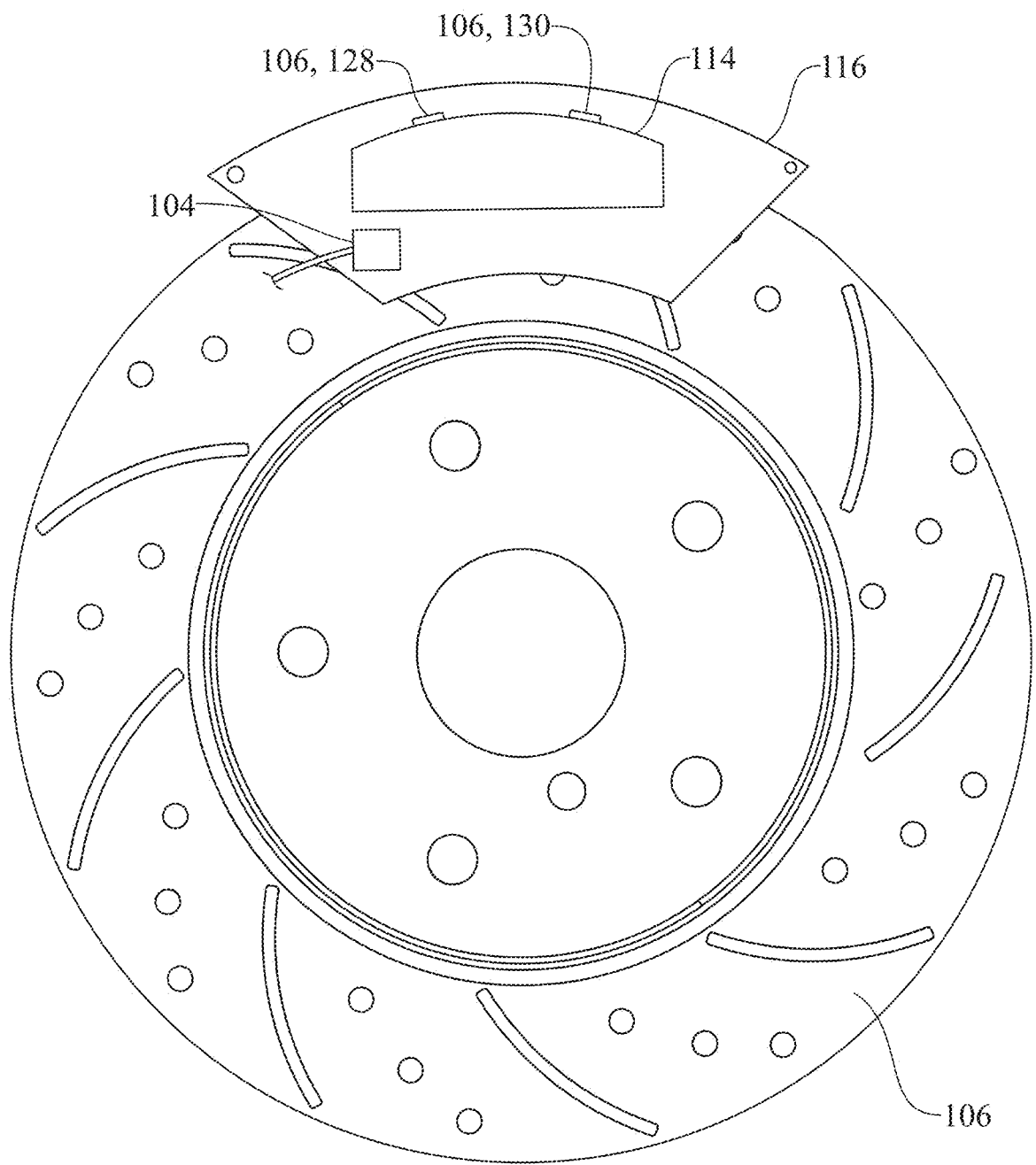
FIG. 8 presents front cutaway view of the brake assembly of FIG. 6 showing the a mounting housing and the sensing apparatus of the brake warning system of the present invention in accordance with an embodiment.

Turning our attention to FIG. 7, a sectional view of a brake assembly 148 with the brake pad 116 and mounting housing 114 configuration in which the light emitting apparatus 106 is directly mounted on the caliper 134 of the brake assembly 148 in accordance with an embodiment of the present invention. The brake assembly 148 comprises the rotor 106, the brake pads 116, the caliper 134, the bleeder 136, the dust boot 138, the piston seal 140, the piston 142, and the anti-rattle clips 144. As will be appreciated, the brake assembly 148 has the brake pads 116, as separated by the slot 120, proximate to each side of the rotor 106 such that when the individual brake pads 116 are engaged by the operator of a vehicle a force will be applied to the rotor thereby braking the vehicle and slowing the vehicle down. In accordance with this embodiment, each one of the brake pads 116 is configured with a respective mounting housing 114 and the first light emitting diode 128 and the second light emitting diode 130, as the case may be, are mounted directly on the caliper 134 (e.g., the outer surface thereof). In this way, the mounting housing is configured to mount to the brake pad of the brake assembly for producing a status indication as a function of the wear condition monitored that is transmitted by the light emitting apparatus.

Figure 3:
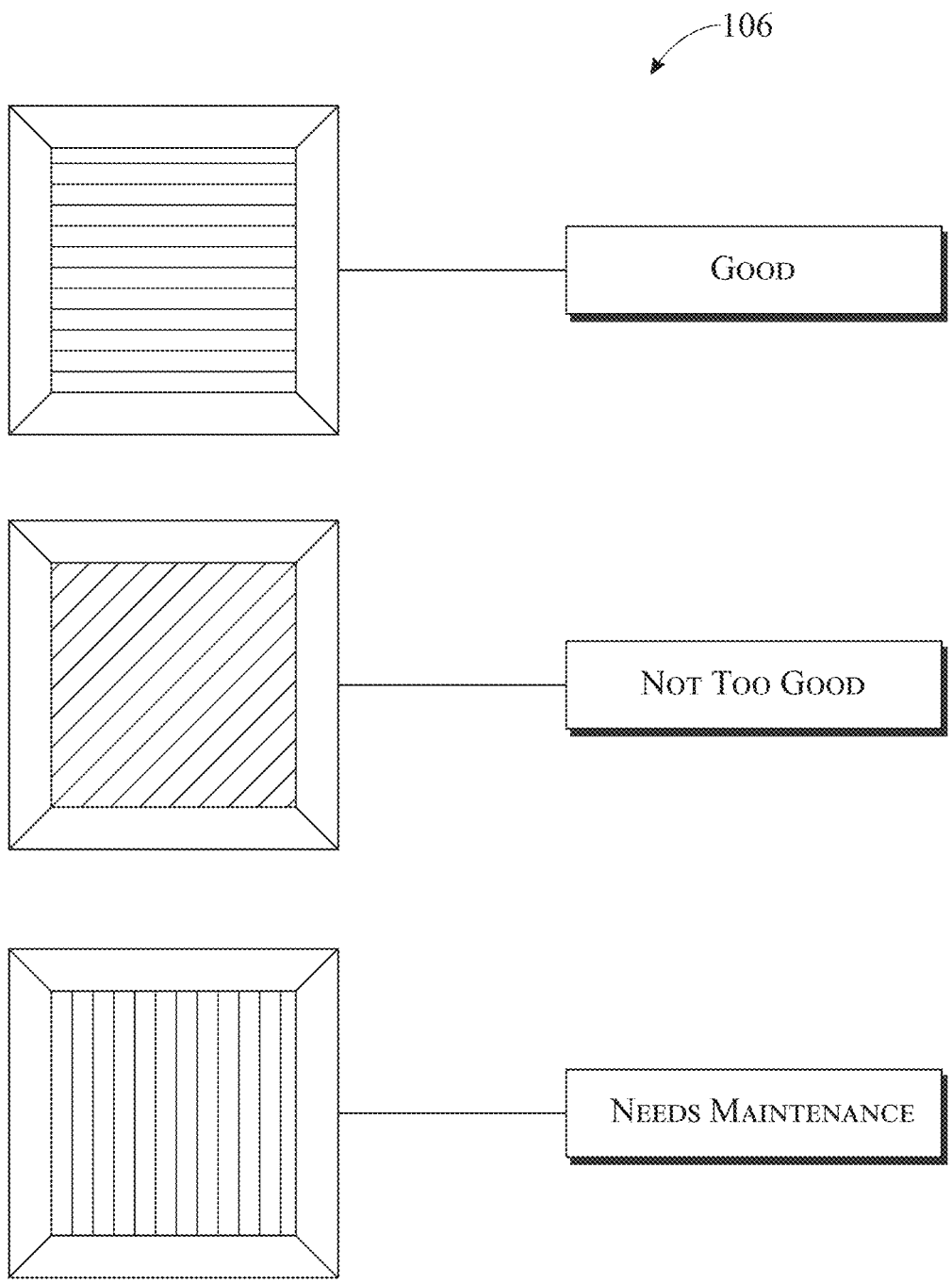
FIG. 3 presents a schematic view of the brake warning system of the present invention showing that the light emitting apparatus produces different color codes in accordance with an embodiment.
Figure 4:
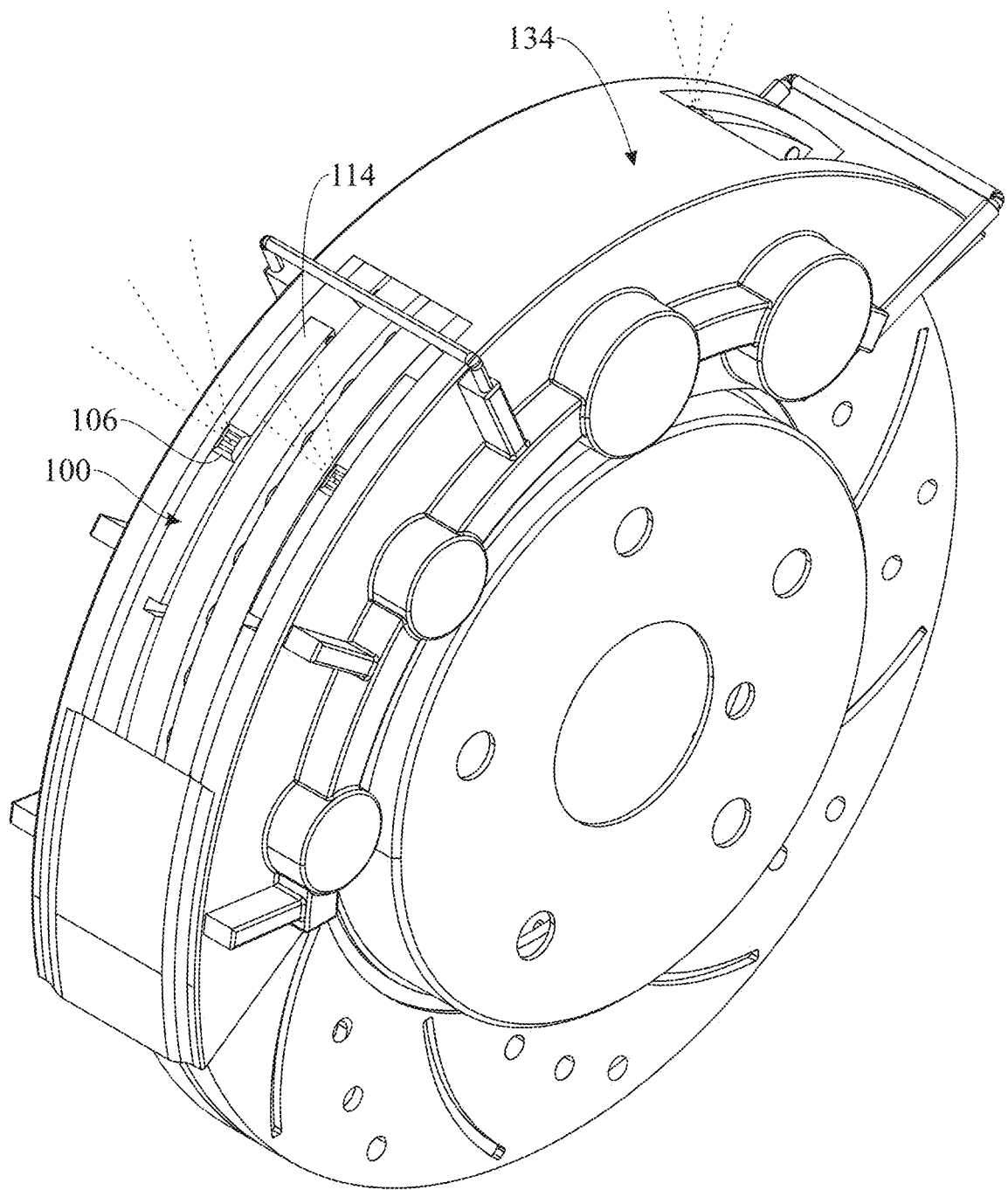
FIG. 4 presents a schematic view of the brake warning system of the present invention showing that the mounting housing is mounted onto a brake pad of a vehicle in accordance with an embodiment.
Figure 5:
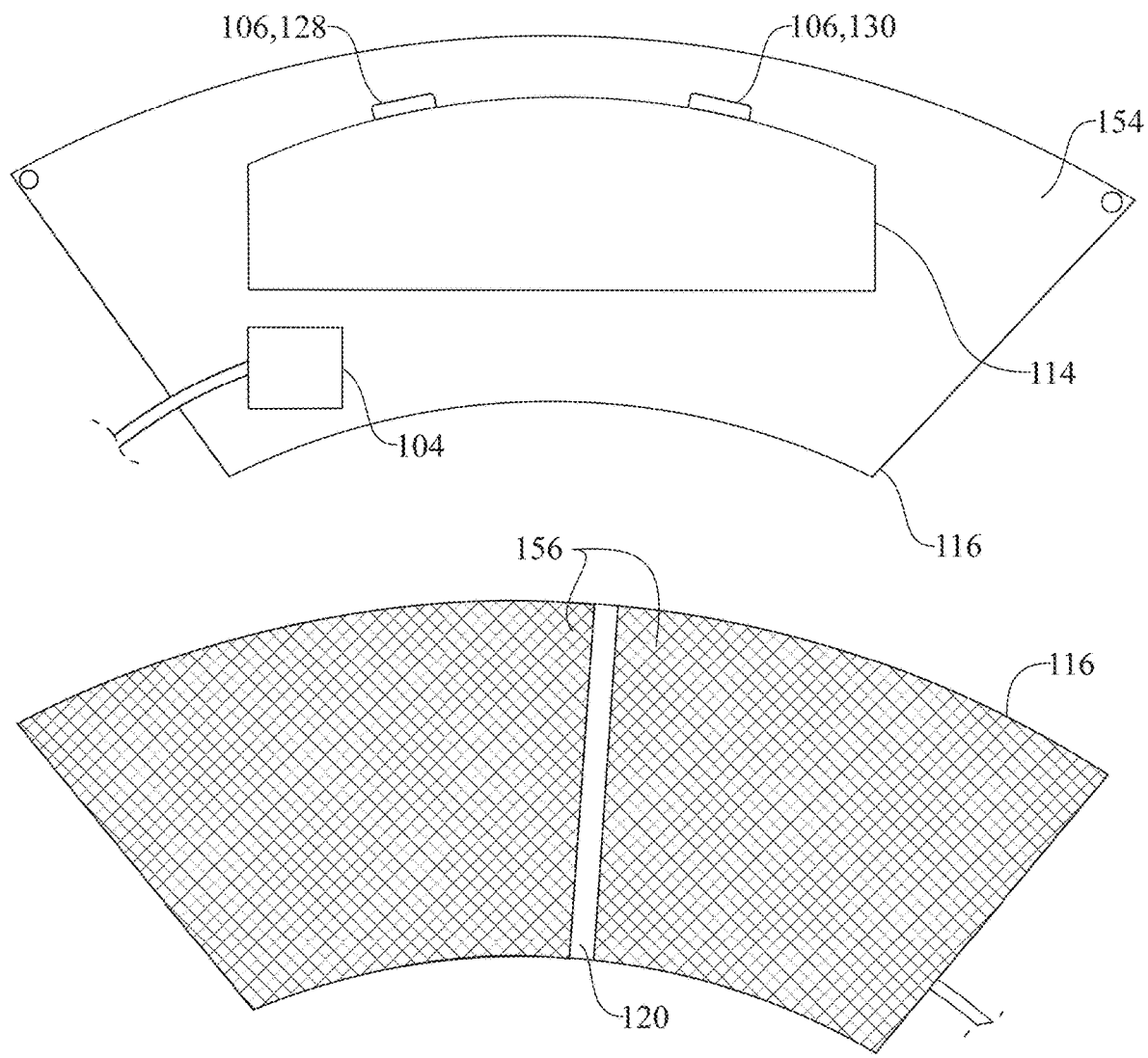
FIG. 5 presents a perspective view of an outer portion and inner portion of a brake pad configured with a portion of a mounting housing of the brake warning system of the present invention in accordance with an embodiment.

In this way, as shown in FIG. 3, the light emitting apparatus 106 may emit a status indication using a green light which indicates that the brake pad 116 is in "GOOD" condition based on the wear condition monitored; the light emitting apparatus 106 may emit yellow light which indicates that the brake pad 116 is in "NOT TOO GOOD" condition based on the wear condition monitored; the light emitting apparatus 106 may emit red light which indicates that the brake pad 116 is in "NEEDS MAINTENANCE" condition based on the wear condition monitored, thus providing the warning that the brake pad 116 may need replacing. Such indications apply equally to the either of the brake assembly configurations shown respectively in FIG. 6 and FIG. 7.

Figure 9:
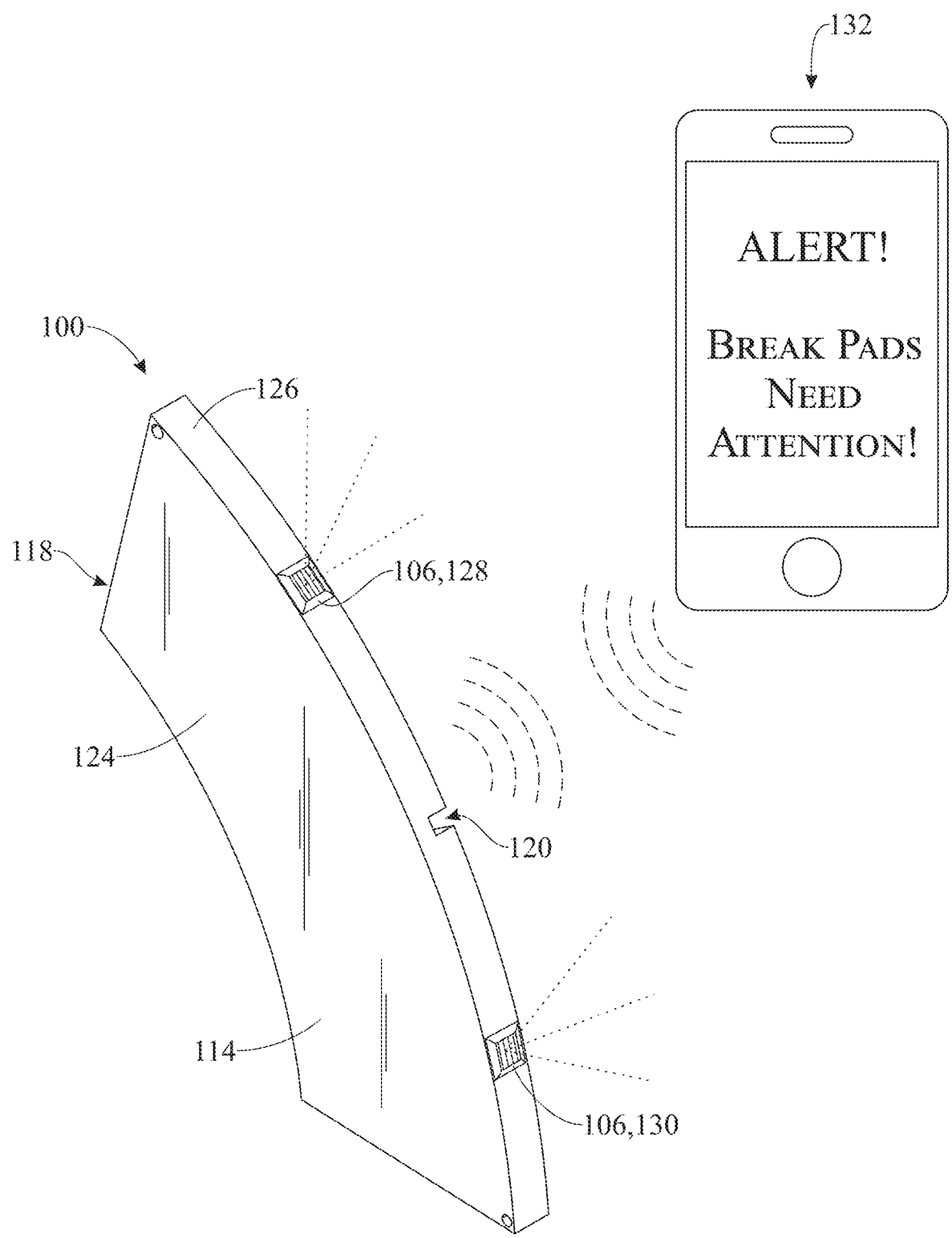
FIG. 9 presents a schematic view of the brake warning system of the present invention in communication with an external user device in accordance with an embodiment.
Figure 10:
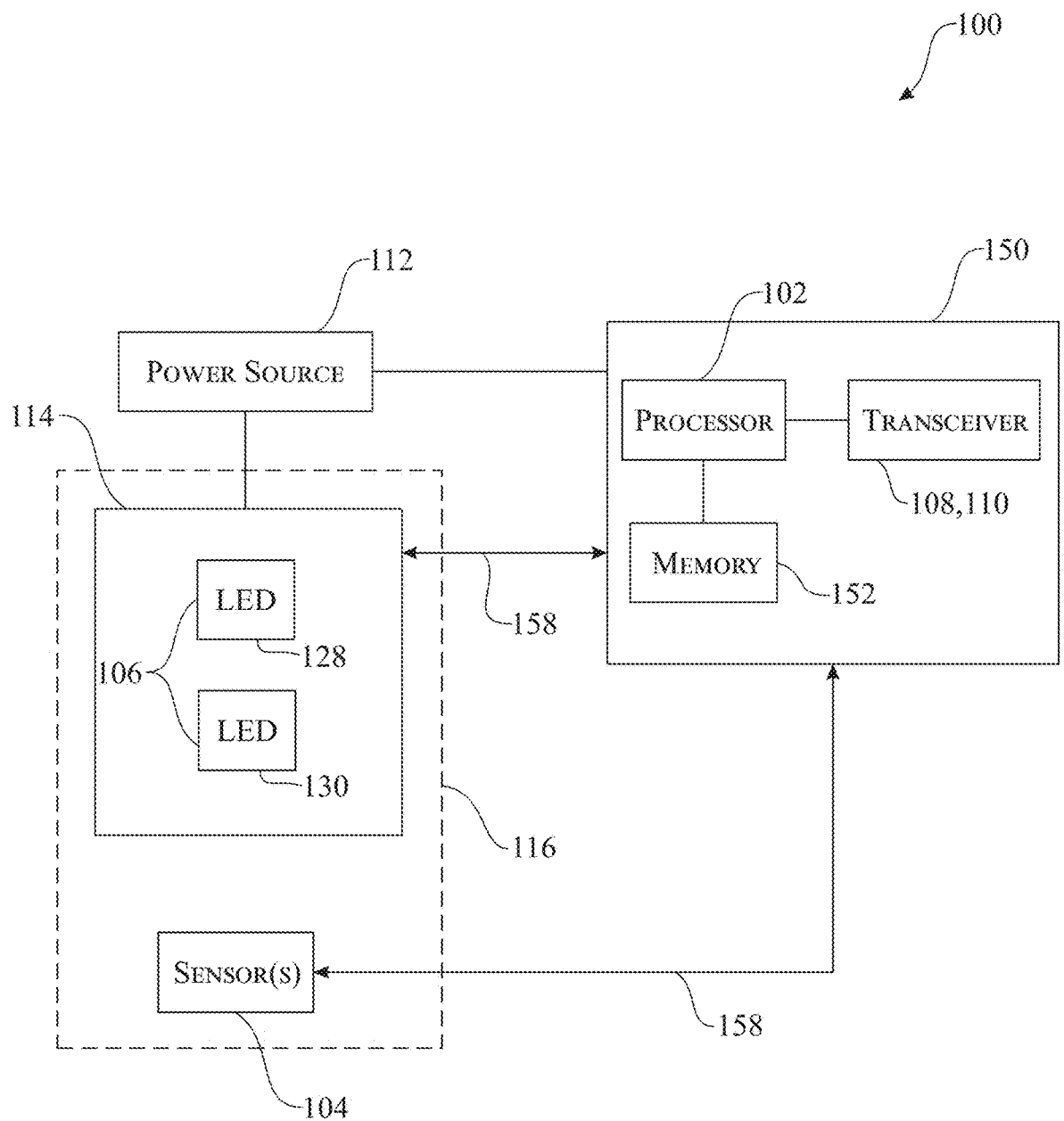
FIG. 10 presents a schematic view of the brake warning system of the present invention showing the connection relationship between components of the brake warning system and the brake pad of the vehicle in accordance with an embodiment.

Additionally, as shown in FIG. 9, the brake warning system 100 is configured to be in communication (e.g., a wireless communication) with an external user device 132 (e.g., a smartphone) via the signal transmitting apparatus 108 and the signal receiving apparatus 110, so as to provide information to and receive instructions from a user associated with the external user device 132. Thus, in an embodiment, the braking warning system 100 generates and transmits, via the signal transmitting apparatus 108, an alert message to the external user device 132 indicating the brake pad 116 needs maintenance attention based on the status indication. For example, the processor 102 might generate a message "ALERT! BRAKE PADS NEED ATTENTION" to the external user device 132 via the signal transmitting apparatus 108. Accordingly, the user will be able to see the warning on the external user device 132. On the other hand, the user could use the external user device 132 to give instructions to the processor 102 via the signal receiving apparatus 110, in order to activate or deactivate the light emitting apparatus 106.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A brake warning system comprising:
   a controller apparatus;
   a mounting housing;
   a sensing apparatus coupled with the mounting housing, wherein the sensing apparatus is configured for monitoring a wear condition of a brake pad of a brake assembly;
   a light emitting apparatus, wherein the light emitting apparatus and the sensing apparatus are electrically coupled with the controller apparatus;
   wherein the mounting housing is configured to mount to the brake pad of the brake assembly for producing a status indication as a function of the wear condition monitored that is transmitted by the light emitting apparatus; and
   wherein the mounting housing further comprises:
   an arc-shaped plate comprising a slot, a first flat surface, a second flat surface and a lateral curved convex surface, wherein the first flat surface and the second flat surface are oppositely located to each other, the lateral curved convex surface is formed in between the first flat surface and the second flat surface, the lateral curved convex surface is perimetrically connected with the first flat surface, the lateral curved convex surface is perimetrically connected with the second flat surface and the slot traverses into the first flat surface.

2. The brake warning system of claim 1, wherein the sensing apparatus detects an electrical current level passing through the brake pad for the monitoring of the wear condition.

3. The brake warning system of claim 2, wherein the controller apparatus receives the electrical current level detected by the sensing apparatus and determines an amount of the electrical current.

4. The brake warning system of claim 3, wherein the controller apparatus activates the light emitting apparatus as a function of the amount of the electrical current determined.

5. The brake warning system of claim 1, wherein the light emitting apparatus produces a plurality of color codes for the status indication, wherein each respective color code of the plurality of color codes represents a respective wear condition of the brake pad.

6. The brake warning system of claim 5, wherein the light emitting apparatus comprises a plurality of light emitting diodes (LEDs), wherein each respective LED of the plurality of LEDs is capable of producing each respective color code of the plurality of color codes.

7. The brake warning system of claim 6, wherein the plurality of LEDs are visually exposed on the lateral curved convex surface.

8. The brake warning system of claim 1, wherein the light emitting apparatus is attached to the lateral curved convex surface.

9. The brake warning system of claim 1, wherein the light emitting apparatus is attached to a brake caliper of the brake assembly.

10. The brake warning system of claim 1, wherein the brake warning system further comprises a power source electrically coupled with and powering the controller apparatus, the sensing apparatus, and the light emitting apparatus, and wherein the controller apparatus further comprises:
    a processor;
    a memory;
    a signal transmitting apparatus; and
    a signal receiving apparatus.

11. The brake warning system of claim 10, wherein the braking warning system communicates with an external user device via the signal transmitting apparatus and the signal receiving apparatus.

12. The brake warning system of claim 11, wherein the braking warning system generates and transmits, using the signal transmitting device, an alert message to the external device indicating the brake pad needs maintenance attention based on the status indication.

13. The brake warning system of claim 1, wherein the light emitting apparatus further comprises a first light emitting diode (LED) and a second LED separated from each other via the slot.

14. A brake warning system comprising:
    a controller apparatus;
    a mounting housing;
    a sensing apparatus coupled with the mounting, housing, wherein the sensing apparatus is configured for monitoring a wear condition of a brake pad of a brake assembly;
    a light emitting apparatus comprising a plurality of light emitting diodes (LEDs), wherein the light emitting apparatus and the sensing apparatus are electrically coupled with the controller apparatus, wherein the controller apparatus activates the light emitting apparatus as a function of the wear condition monitored;
    a power source electrically coupled with and powering the controller apparatus, the sensing apparatus and the light emitting apparatus;
    wherein the mounting housing is configured to mount to the brake pad of the brake assembly for producing a status indication as a function of the wear condition monitored that is transmitted using the plurality of LEDs; and
    wherein the mounting housing further comprises:
    an arc-shaped plate comprising a slot, a first flat surface, a second flat surface and a lateral curved convex surface, wherein the first flat surface and the second flat surface are oppositely located to each other, the lateral curved convex surface is formed in between the first flat surface and the second flat surface, the lateral curved convex surface is perimetrically connected with the first flat surface, the lateral curved convex surface is perimetrically connected with the second flat surface and the slot traverses into the first flat surface.

15. The brake warning system of claim 14, wherein the light emitting apparatus is attached to either the lateral curved convex surface of the arc-shaped plate of the mounting assembly or a brake caliper of the brake assembly.

16. The brake warning system of claim 14, wherein the brake warning system further comprises a power source electrically coupled with and powering the controller apparatus, the sensing apparatus, and the light emitting apparatus, and wherein the controller apparatus further comprises:
    a processor;
    a memory;
    a signal transmitting apparatus; and
    a signal receiving apparatus.

17. The brake warning system of claim 16, wherein the braking warning system generates and transmits, via the signal transmitting apparatus, an alert message to an external device indicating the brake pad needs maintenance attention based on the status indication.

18. A brake warning system comprising:
- a controller apparatus comprising a processor, a memory, and a transceiver;
- a mounting housing comprising an arc-shaped plate comprising a slot, a first flat surface, a second flat surface and a lateral curved convex surface, wherein the first flat surface and the second flat surface are oppositely located to each other, the lateral curved convex surface is formed in between the first flat surface and the second flat surface, the lateral curved convex surface is perimetrically connected with the first flat surface, the lateral curved convex surface is perimetrically connected with the second flat surface and the slot traverses into the first flat surface;
- a sensing apparatus coupled with the mounting housing, wherein the sensing apparatus is configured for monitoring a wear condition of a brake pad of a brake assembly;
- a light emitting apparatus comprising a plurality of light emitting diodes (LEDs), wherein the light emitting apparatus is attached to either the lateral curved convex surface of the arc-shaped plate of the mounting assembly or a brake caliper of the brake assembly, the light emitting apparatus and the sensing apparatus are electrically coupled with the controller apparatus, and wherein the controller apparatus activates the light emitting apparatus as a function of the wear condition monitored; and
- wherein the mounting housing is configured to mount to the brake pad of the brake assembly for producing a status indication as a function of the wear condition monitored that is transmitted using the plurality of LEDs, the plurality of LEDs producing a plurality of color codes for the status indication, wherein each respective color code of the plurality of color codes represents a respective wear condition of the brake pad; and
- wherein the braking warning system generates and transmits using the transceiver an alert message to an external device indicating the brake pad needs maintenance attention based on the status indication produced.

* * * * *